United States Patent
Kusayanagi et al.

(10) Patent No.: US 10,311,618 B2
(45) Date of Patent: Jun. 4, 2019

(54) VIRTUAL VIEWPOINT POSITION CONTROL DEVICE AND VIRTUAL VIEWPOINT POSITION CONTROL METHOD

(71) Applicant: Nissan Motor Co., Ltd., Yokohama-Shi, Kanagawa (JP)

(72) Inventors: Yoshinori Kusayanagi, Kanagawa (JP); Norimasa Kishi, Kanagawa (JP)

(73) Assignee: Nissan Motor Co., Ltd., Yokohama-shi, Kanagawa (JP)

(*) Notice: Subject to any disclaimer, the term of this patent is extended or adjusted under 35 U.S.C. 154(b) by 0 days.

(21) Appl. No.: 15/765,957

(22) PCT Filed: Sep. 9, 2016

(86) PCT No.: PCT/JP2016/076566
§ 371 (c)(1),
(2) Date: Apr. 4, 2018

(87) PCT Pub. No.: WO2017/061230
PCT Pub. Date: Apr. 13, 2017

(65) Prior Publication Data
US 2018/0286095 A1 Oct. 4, 2018

(30) Foreign Application Priority Data

Oct. 8, 2015 (JP) ................... 2015-199918

(51) Int. Cl.
*B60R 1/00* (2006.01)
*H04N 7/18* (2006.01)
*G06T 11/60* (2006.01)

(52) U.S. Cl.
CPC ............. *G06T 11/60* (2013.01); *B60R 1/00* (2013.01); *H04N 7/18* (2013.01);
(Continued)

(58) Field of Classification Search
None
See application file for complete search history.

(56) References Cited

U.S. PATENT DOCUMENTS 7,161,616 B1  1/2007  Okamoto et al.
2007/0270215 A1* 11/2007  Miyamoto ............ A63F 13/10
                                                  463/32

(Continued)

FOREIGN PATENT DOCUMENTS

CN  101269635 A   9/2008
CN  103596812 A   2/2014
(Continued)

OTHER PUBLICATIONS

The Crew—Camera Lock (GlovePIE) Jan. 1, 2015 https://www.youtube.com/watch?v=LekGhq6xWVQ.*

*Primary Examiner* — Jason A Pringle-Parker
(74) *Attorney, Agent, or Firm* — Young Basile Hanlon & MacFarlane, P.C.

(57) ABSTRACT

A display assistance device detects the steering angle of a vehicle by using a steering angle sensor, and changes the position of a virtual viewpoint behind the host vehicle based on the detected steering angle. Then, the display assistance device converts images captured using a plurality of cameras such as a front camera and a rear camera into an overhead image of a downward view from the virtual viewpoint, and displays the converted overhead image on a display with a host vehicle icon superimposed on the overhead image, the host vehicle icon indicating the position of the vehicle.

12 Claims, 14 Drawing Sheets

(52) U.S. Cl.
    CPC ... *B60R 2300/105* (2013.01); *B60R 2300/602* (2013.01); *B60R 2300/605* (2013.01); *B60R 2300/607* (2013.01)

(56) References Cited

U.S. PATENT DOCUMENTS

| | | |
|---|---|---|
| 2008/0186382 A1 | 8/2008 | Tauchi et al. |
| 2008/0231703 A1 | 9/2008 | Nagata et al. |
| 2011/0026771 A1* | 2/2011 | Hsu .................... G06K 9/00805 |
| | | 382/104 |
| 2011/0293145 A1 | 12/2011 | Nogami et al. |
| 2014/0043466 A1* | 2/2014 | Sato .......................... B60R 1/00 |
| | | 348/115 |
| 2014/0354452 A1 | 12/2014 | Okuyama |
| 2015/0319370 A1 | 11/2015 | Wang et al. |
| 2016/0196748 A1* | 7/2016 | Yellambalase .......... B60R 11/04 |
| | | 340/435 |

FOREIGN PATENT DOCUMENTS

| | | |
|---|---|---|
| DE | 112013005231 T5 | 8/2015 |
| JP | 2007-210458 A | 8/2007 |
| JP | 2011-004201 A | 1/2011 |
| JP | 2011-030078 A | 2/2011 |
| JP | 2012-175314 A | 9/2012 |
| JP | 2012-195793 A | 10/2012 |
| JP | 2012-253428 A | 12/2012 |
| WO | 00064175 A1 | 10/2000 |
| WO | 2010/122747 A1 | 10/2010 |

\* cited by examiner

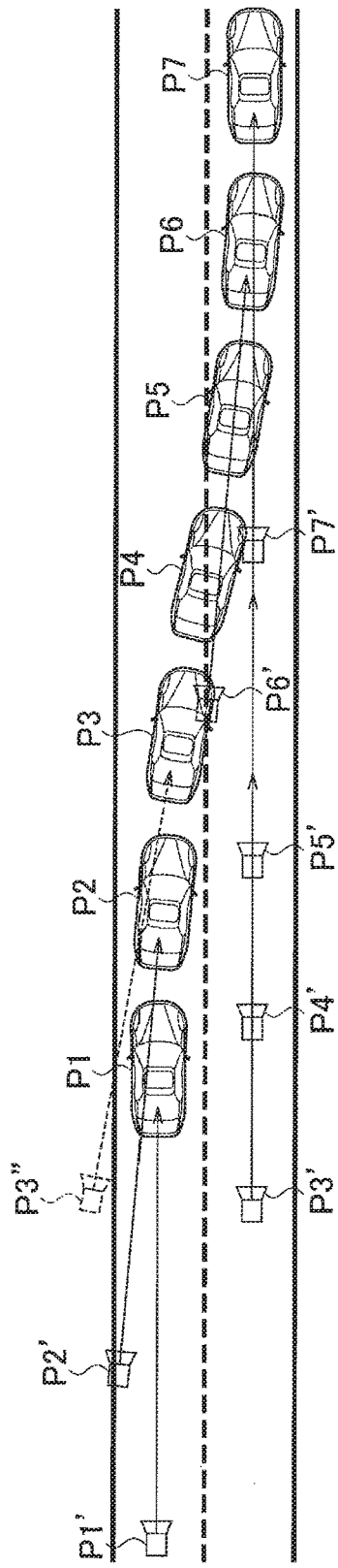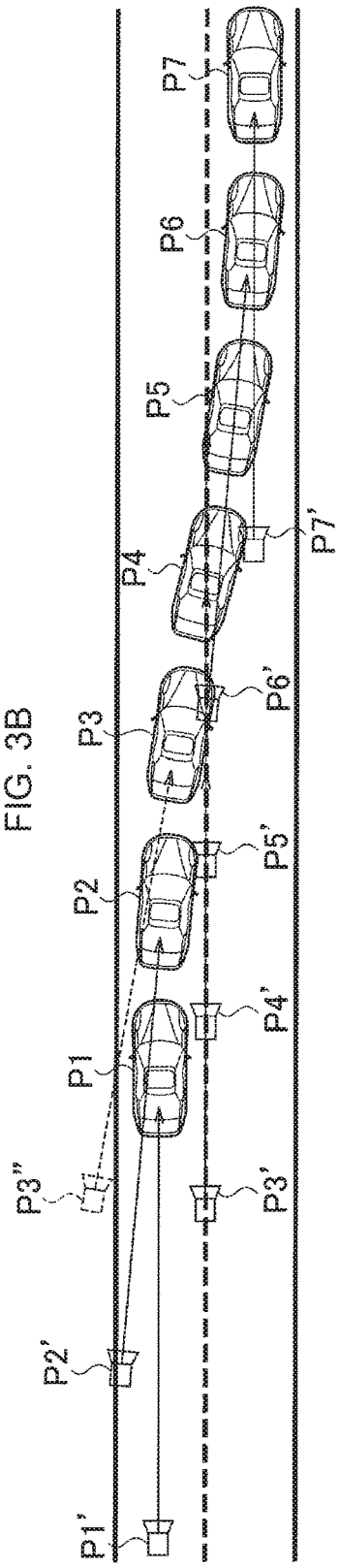

VIRTUAL VIEWPOINT POSITION CONTROL DEVICE AND VIRTUAL VIEWPOINT POSITION CONTROL METHOD

CROSS-REFERENCE TO RELATED APPLICATION(S)

This application claims priority to and the benefit of Japanese Patent Application No. 2015-199918, filed Oct. 8, 2015, the entire disclosure of which is hereby incorporated by reference.

TECHNICAL FIELD

The present invention relates to a display assistance device and a display assistance method.

BACKGROUND

Heretofore, a technique has been known in which a combined image as a view from a virtual viewpoint is generated using images captured by a plurality of cameras mounted on a vehicle (Japanese Patent Application Publication No. 2012-253428). In Japanese Patent Application Publication No. 2012-253428, the combined image is displayed on a display to notify the driver of the environment (e.g. following vehicle) around the host vehicle. However, in a case where the virtual viewpoint is set behind the host vehicle as in Japanese Patent Application Publication No. 2012-253428, the position of the virtual viewpoint moves with the driver's steering. Then, as the position of the virtual viewpoint moves, a following vehicle displayed in the combined image may possibly disappear, making it difficult for the driver to grasp the situation around the host vehicle.

SUMMARY

The present invention has been made in view of the above problem, and an object thereof is to provide a display assistance device and a display assistance method that enable the driver to grasp the situation around the host vehicle by controlling the position of a virtual viewpoint based on steering.

A display assistance device according to an aspect of the present invention detects the steering angle of a vehicle, and changes the position of a virtual viewpoint based on the detected steering angle.

According to the present invention, the driver can grasp the situation around the host vehicle as a result of controlling the position of a virtual viewpoint based on steering.

BRIEF DESCRIPTION OF THE DRAWINGS

FIGS. 3A and 3B are diagrams explaining virtual viewpoint positions changed by the display assistance device according to the first embodiment of the present invention;

DETAILED DESCRIPTION

Embodiments of the present invention will be described below with reference to the drawings. In the illustration of the drawings, identical parts are denoted by the same reference sign, and description thereof will be omitted. Also, a case where the host vehicle travels on a straight road will be described in a first embodiment, and a case where the host vehicle travels on a curve will be described in a second embodiment.

[First Embodiment]

Figure 1:
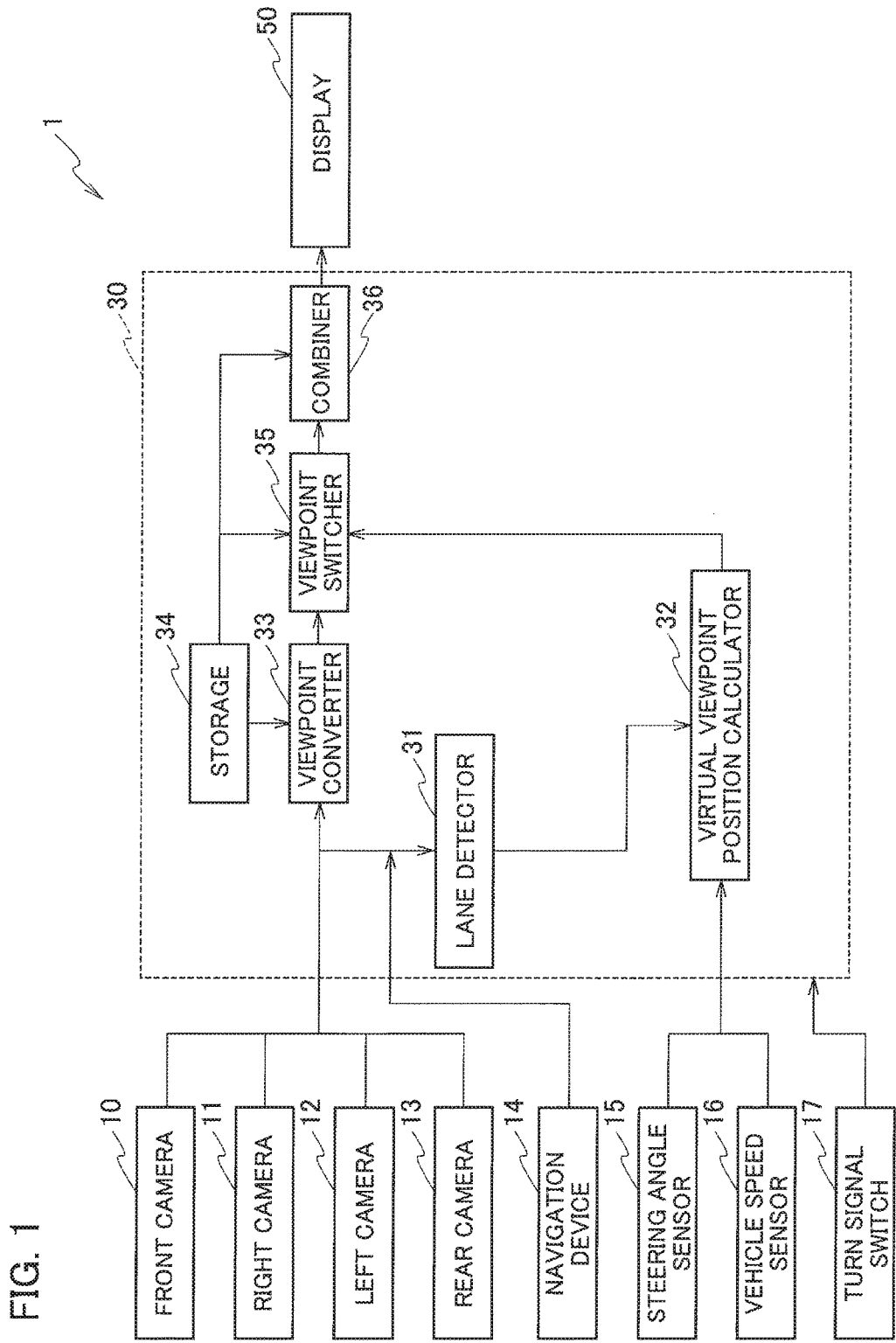
FIG. 1 is a block diagram of a display assistance device according to a first embodiment of the present invention.

A display assistance device 1 according to the first embodiment will be described with reference to FIG. 1. As illustrated in FIG. 1, the display assistance device 1 includes a front camera 10, a right camera 11, a left camera 12, a rear camera 13, a navigation device 14, a steering angle sensor 15, a vehicle speed sensor 16, a turn signal switch 17, a controller 30, and a display 50.

The front camera 10, the right camera 11, the left camera 12, and the rear camera 13 (imaging units) are cameras with an imaging element such as a CCD (charge-coupled device) or a CMOS (complementary metal oxide semiconductor), and installed at positions from which they can capture images of the front, right, left, and rear sides of the host vehicle, respectively. These cameras output captured images to the controller 30.

Note that in the following description, the four cameras, namely the front camera 10, the right camera 11, the left camera 12, and the rear camera 13 will be described as "the front camera 10 and the like".

The navigation device 14 includes a GPS receiver and a map database, and calculates a travel route to a destination set by an occupant by using the location of the host vehicle detected by the GPS receiver and the map database. The navigation device 14 outputs the calculated travel route to the controller 30. Note that the map database may be stored in a server instead of the navigation device 14. In the case where the map database is stored in a server, the navigation device 14 can acquire map information as necessary through communication.

The steering angle sensor 15 detects the steering angle of the host vehicle and outputs the detected steering angle to the controller 30.

The vehicle speed sensor 16 detects the speed of the host vehicle from the number of rotations of its wheels and outputs the detected speed to the controller 30.

The turn signal switch 17 is installed around the steering wheel, and detects the direction of turn when the host vehicle turns right or left or when the host vehicle makes a lane change. The turn signal switch 17 outputs the detected direction of turn to the controller 30.

The controller 30 is a device that generates a combined image to be displayed on the display 50 by using camera images, the steering angle, and so on and is, for example, a computer including a CPU, an ROM, and an RAM, as well as a data bus and input-output interfaces connecting them. When seen in terms of function, the controller 30 can be divided into a lane detector 31, a virtual viewpoint position calculator 32, a viewpoint converter 33, a storage 34, a viewpoint switcher 35, and a combiner 36.

The lane detector 31 detects the lanes on the road including the travel lane in which the host vehicle is travelling (hereinafter simply referred to as the host vehicle lane) by acquiring information from the images captured by the front camera 10 and the like and the navigation device 14. The lane detector 31 also detects boundary lines such as the lane lines and the edge line, which serves to distinguish between a lane and a region outside the lane.

The virtual viewpoint position calculator 32 calculates the position of a virtual viewpoint for overlooking the host vehicle from a rear side in the air (hereinafter simply referred to as the virtual viewpoint position), by using the steering angle and the vehicle speed acquired from the steering angle sensor 15 and the vehicle speed sensor 16. More specifically, the virtual viewpoint position calculator 32 calculates the virtual viewpoint position in the direction of travel of the host vehicle by using the vehicle speed, and calculates the virtual viewpoint position in the vehicle width direction of the host vehicle by using the steering angle. Note that although the first embodiment will be described assuming that the virtual viewpoint position is set on the center axis running across the vehicle width direction of the host vehicle, the virtual viewpoint position is not limited to this.

The viewpoint converter 33 converts the images captured by the front camera 10 and the like into an overhead image of a downward view from the virtual viewpoint by using a conversion map stored in the storage 34.

The storage 34 stores the conversion map to be used by the viewpoint converter 33, an icon to be used by the combiner 36, and so on.

The viewpoint switcher 35 (changing unit) determines whether or not the virtual viewpoint position calculated by the virtual viewpoint position calculator 32 is outside the host vehicle lane. The viewpoint switcher 35 then changes the virtual viewpoint position depending on the result of the determination. Details of the operation of the viewpoint switcher 35 will be described later.

The combiner 36 (editing unit) generates a combined image by superimposing the icon and/or the like stored in the storage 34 onto the overhead image converted by the viewpoint converter 33. The combiner 36 then outputs the generated combined image to the display 50.

The display 50 (displaying unit) is, for example, a liquid crystal display installed on the instrument panel or a liquid crystal display used for the navigation device 14 and displays various pieces of information to occupants.

Next, the virtual viewpoint position in the direction of travel of the host vehicle, calculated in accordance with the vehicle speed by the virtual viewpoint position calculator 32, will be described with reference to FIGS. 2A-2C.

First, the virtual viewpoint position in a case where the host vehicle travels at a reference speed will be described with reference to FIG. 2A. The reference speed is not a particularly limited speed, but will be described as, for example, 50 km/h in the first embodiment. As illustrated in FIG. 2A, in the case where the host vehicle is traveling at the reference speed, the virtual viewpoint position calculator 32 calculates a virtual viewpoint position C1 as a position 50 m away from the host vehicle in a horizontally rearward direction and 25 m away from the road surface in the vertically upward direction. Also, the virtual viewpoint position calculator 32 sets the angle formed between the direction of a line of sight looking down the host vehicle from the virtual viewpoint position C1 (the dotted line in FIG. 2A) and a horizontal plane at the height of the virtual viewpoint position C1 to 30 degrees.

Next, the virtual viewpoint position in a case where the host vehicle travels at a speed higher than the reference speed, e.g. 70 km/h will be described with reference to FIG. 2B. As illustrated in FIG. 2B, when the host vehicle travels at high speed, the virtual viewpoint position calculator 32 calculates a virtual viewpoint position C2 as a position farther from the host vehicle in the rearward direction and lower from the road surface than the virtual viewpoint position C1 is. Specifically, as illustrated in FIG. 2B, the virtual viewpoint position calculator 32 calculates the virtual viewpoint position C2 as a position 70 m away from the host vehicle in the horizontally rearward direction and 15 m away from the road surface in the vertically upward direction. Also, the virtual viewpoint position calculator 32 sets the angle formed between the direction of a line of sight looking down the host vehicle from the virtual viewpoint position C2 (the dotted line in FIG. 2B) and a horizontal plane at the height of the virtual viewpoint position C2 to 15 degrees. Thus, when the speed is high, the virtual viewpoint position C2, illustrated in FIG. 2B, is calculated. With an overhead image of a downward view from the virtual viewpoint position C2, it is possible to grasp the situation of a broad area behind the host vehicle as compared to FIG. 2A. Thus, in a case where a following vehicle is present behind the host vehicle, the driver can quickly realize the presence of the following vehicle. This makes it easier for the driver to merge or make a lane change.

Next, the virtual viewpoint position in a case where the host vehicle travels at a speed lower than the reference speed, e.g. 30 km/h will be described with reference to FIG. 2C. As illustrated in FIG. 2C, when the host vehicle travels at low speed, the virtual viewpoint position calculator 32 calculates a virtual viewpoint position C3 as a position closer from the host vehicle in the rearward direction and higher from the road surface than the virtual viewpoint position C1 is. Specifically, as illustrated in FIG. 2C, the virtual viewpoint position calculator 32 calculates the virtual viewpoint position C3 as a position 30 m away from the host vehicle in the horizontally rearward direction and 30 m away from the road surface in the vertically upward direction.

Also, the virtual viewpoint position calculator 32 sets the angle formed between the direction of a line of sight looking down the host vehicle from the virtual viewpoint position C3 (the dotted line in FIG. 2C) and a horizontal plane at the height of the virtual viewpoint position C3 to 45 degrees. Thus, when the speed is low, the virtual viewpoint position C3, illustrated in FIG. 2C, is calculated. With an overhead image of a downward view from the virtual viewpoint position C3, how the situation around the host vehicle changes can be easily grasped as compared to FIG. 2A. Thus, in a case where a following vehicle is present behind the host vehicle, the driver can easily check the distance to the following vehicle. This makes it easier for the driver to merge or make a lane change.

Figure 2A:
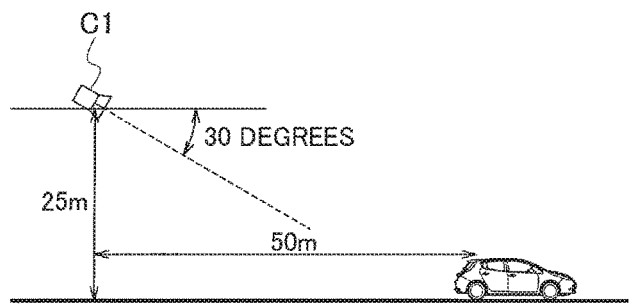
FIGS. 2A-2C are diagrams explaining a virtual viewpoint position in a case of traveling at a reference speed, a virtual viewpoint position in a case of traveling at a speed higher than the reference speed, and a virtual viewpoint position in a case of traveling at a speed lower than the reference speed, respectively.
Figure 2B:
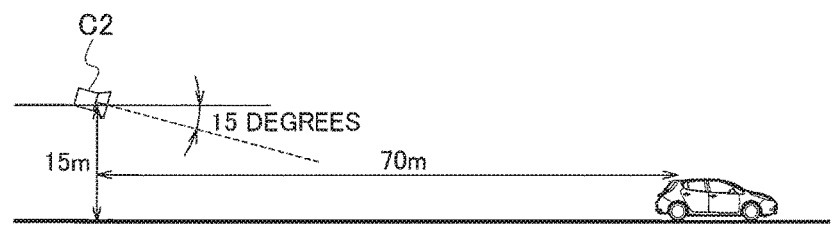
Figure 2C:
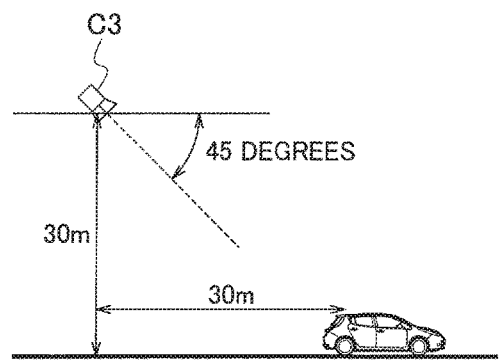

Meanwhile, in the examples illustrated in FIGS. 2A-2C, the virtual viewpoint positions are described with respect to one reference speed, in terms of whether the vehicle speed is higher or lower than this reference speed. However, the reference speed is not limited to one speed. A plurality of reference speeds may be set (e.g. reference speed 1, reference speed 2, reference speed 1>reference speed 2), the vehicle speed may be divided into smaller ranges and associated with the reference speeds, and the virtual viewpoint position may be calculated with them.

Next, virtual viewpoint positions changed by the viewpoint switcher 35 will be described with reference to FIGS. 3A and 3B.

The travel scene illustrated in FIG. 3A is a scene in which the host vehicle traveling in the left lane of a two-lane road makes a lane change to the right lane. Reference signs P1 to P7 illustrated in FIG. 3A denote host vehicle positions. Also, reference signs P1' to P7' illustrated in FIG. 3A denote virtual viewpoint positions corresponding to the host vehicle positions P1 to P7, respectively. Meanwhile, the distance from the host vehicle to a virtual viewpoint position in the direction of travel of the host vehicle (hereinafter simply referred to as the host vehicle-virtual viewpoint distance) is assumed to be set in accordance with the speed of the host vehicle. Also, the arrow extending from each virtual viewpoint position indicates the direction of the line of sight from the virtual viewpoint.

In the first embodiment, the virtual viewpoint position is present on the center axis running across the vehicle width direction of the host vehicle. For this reason, when the driver turns the steering wheel in the clockwise direction in an attempt to make a lane change to the right lane, the host vehicle moves from the host vehicle position P1 to the host vehicle position P2. At this moment, the virtual viewpoint position P1' moves to the virtual viewpoint position P2'. Thus, the virtual viewpoint position moves in accordance with the driver's steering, that is, the steering angle. More specifically, at the host vehicle position P1, the steering wheel is at the neutral position and the steering angle is 0 degree. As the driver turns the steering wheel in the clockwise direction from the host vehicle position P1, the steering angle increases. The virtual viewpoint position calculator 32 calculates the virtual viewpoint position P2' in accordance with the increased steering angle. The state in which the virtual viewpoint position moves in conjunction with the steering angle as above will be expressed as the host vehicle-fixed state below.

As the host vehicle then moves from the host vehicle position P2 to the host vehicle position P3 with the steering wheel turned, a virtual viewpoint position P3" moves out of the host vehicle lane. As the virtual viewpoint position moves out of the host vehicle lane as above, the information on the area behind the host vehicle captured by the overhead image of the downward view from the virtual viewpoint decreases. For example, a following vehicle displayed in the overhead image before the virtual viewpoint position moves out of the host vehicle lane may not be displayed in the overhead image after the virtual viewpoint position moves out of the host vehicle lane. For this reason, if the virtual viewpoint position P3" moves out of the host vehicle lane, the viewpoint switcher 35 changes the virtual viewpoint position to the lane-change target lane, or the right lane. Specifically, as illustrated in FIG. 3A, the viewpoint switcher 35 changes the virtual viewpoint position from the virtual viewpoint position P3" to the virtual viewpoint position P3'. In this way, the overhead image of the downward view from the virtual viewpoint position P3' can capture more information on the area behind the host vehicle than does the overhead image of the downward view from the virtual viewpoint position P3".

Now, a method of determining whether or not the virtual viewpoint position is outside the host vehicle lane will be described. This determination is made by the viewpoint switcher 35.

In a case where the host vehicle is traveling on a straight road as illustrated in FIG. 3A, the virtual viewpoint position can be unambiguously calculated from the steering angle and the host vehicle-virtual viewpoint distance. For example, the longer the host vehicle-virtual viewpoint distance is relative to a steering angle, the farther the virtual viewpoint position is away from the host vehicle lane. Moreover, the larger the steering angle is relative to a host vehicle-virtual viewpoint distance, the farther the virtual viewpoint position is away from the host vehicle lane. Thus, the steering angle and the host vehicle-virtual viewpoint distance each have a correlation with the distance from the host vehicle lane to the virtual viewpoint position. For this reason, the viewpoint switcher 35 can determine whether or not the virtual viewpoint position is outside the host vehicle lane by referring to a map indicating the relation between the steering angle and the distance from the host vehicle lane to the virtual viewpoint position and a map indicating the relation between the host vehicle-virtual viewpoint distance and the distance from the host vehicle lane to the virtual viewpoint position, which have been obtained in advance via tests and simulations. Note that these maps can be stored in the storage 34.

Referring back to FIG. 3A again, as the host vehicle travels forward to the host vehicle positions P4 and P5, the virtual viewpoint position moves to the virtual viewpoint positions P4' and P5', respectively. Specifically, after the viewpoint switcher 35 changes the virtual viewpoint position to the virtual viewpoint position P3', the virtual viewpoint position does not move in conjunction with the steering angle but remains fixed in the vehicle width direction and moves above the lane-change target lane, or the right lane, while maintaining the host vehicle-virtual viewpoint distance until the host vehicle crosses to the next lane. The state where the virtual viewpoint position does not move in conjunction with the steering angle but remains fixed in the vehicle width direction and moves above a lane as above will be expressed as the road-fixed state below. The reason why the virtual viewpoint position is in the road-fixed state until the host vehicle crosses to the next lane is for the overhead image to capture more information on the area behind the host vehicle.

Then, after the host vehicle crosses to the next lane as illustrated by the host vehicle position P6, the viewpoint switcher 35 switches the virtual viewpoint position from the road-fixed state to the host vehicle-fixed state. As a result, the virtual viewpoint position moves from the virtual viewpoint position P5' to the virtual viewpoint position P6'. Then, as illustrated by the host vehicle position P7, as the steering angle reaches nearly 0 degree, the virtual viewpoint position moves from the virtual viewpoint position P6' to the virtual viewpoint position P7'.

In the example illustrated in FIG. 3A, the virtual viewpoint position is changed to above the lane-change target lane when the virtual viewpoint position moves out of the host vehicle lane. However, the present invention is not limited to this. For example, as illustrated in FIG. 3B, the virtual viewpoint position may be changed to above the lane line instead of above the lane-change target lane. FIGS. 4A-4G illustrate an example of the overhead images displayed on the display 50 in a case where the virtual viewpoint position is changed as illustrated in FIG. 3B.

Figure 4A:
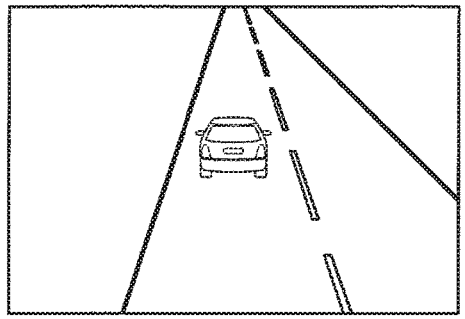
FIGS. 4A-4G are diagrams explaining images displayed on a display by the display assistance device according to the first embodiment of the present invention.
Figure 4E:
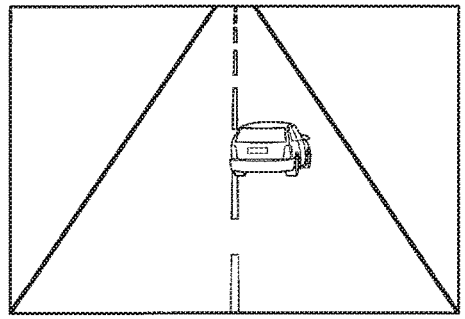
Figure 4B:
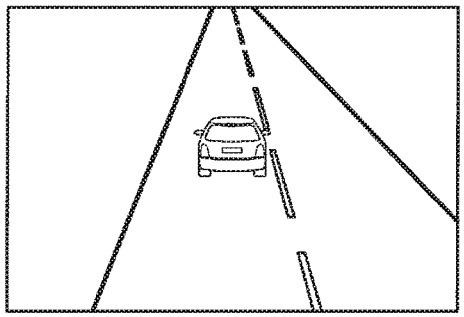
Figure 4F:
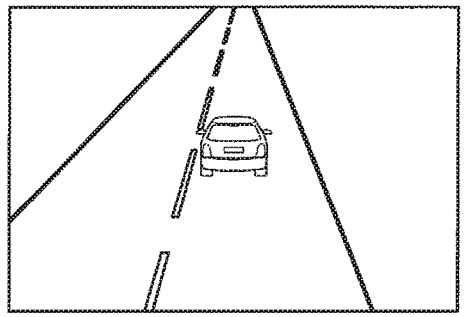
Figure 4C:
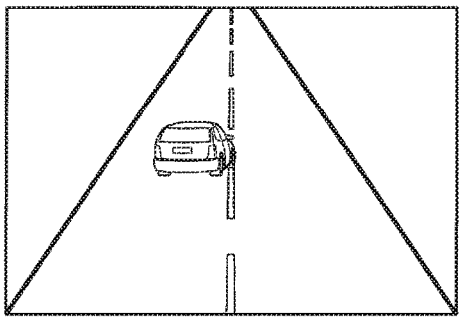
Figure 4G:
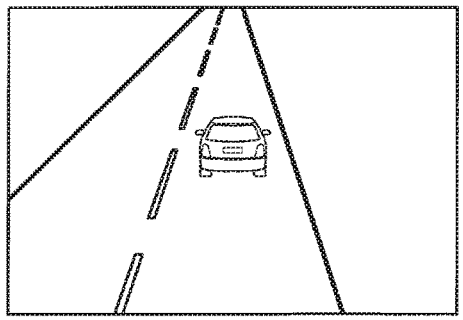
Figure 4D:
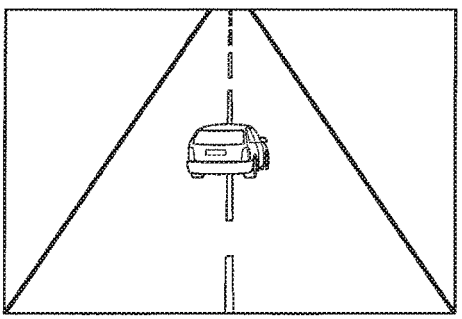

The overhead images illustrated in FIGS. 4A-4G correspond to the overhead images of the downward views from the virtual viewpoint positions P1' to P7', illustrated in FIG. 3B, respectively. As illustrated in FIGS. 4A and 4B, the virtual viewpoint position is in the host vehicle-fixed state, that is, moves in conjunction with the steering angle until the virtual viewpoint position moves out of the host vehicle lane. As illustrated in FIGS. 4C-4E, when the virtual viewpoint position moves out of the host vehicle lane, the virtual viewpoint position is set to the road-fixed state and the lane line is displayed at the center of the overhead image until the host vehicle crosses to the next lane. In this way, a broader area behind the host vehicle can be displayed. If a following vehicle is present in the right lane, the driver can quickly realize the presence of the following vehicle.

Then, as illustrated in FIGS. 4F and 4G, when the host vehicle crosses to the next lane, the viewpoint switcher 35 switches the virtual viewpoint position from the road-fixed state to the host vehicle-fixed state.

Note that although the examples illustrated in FIGS. 3A and 3B have been described using a two-lane road, the present invention is not limited to this. For example, in a case where the host vehicle travelling in the center lane of a three-lane road is moving to the right lane, the virtual viewpoint position may be changed to above the right lane when the virtual viewpoint position moves out of the center lane to the left lane. Alternatively, the virtual viewpoint position may be changed to above the lane line between the center lane and the right lane instead of above the right lane.

Meanwhile, the viewpoint switcher 35 can use the steering angle to determine whether or not the host vehicle has crossed to the next lane. Generally, in a lane change, the steering angle changes in the pattern of one period of a sinusoidal wave as a result of turning the steering wheel back and forth. For example, in a case of making a lane change to a right lane, the steering angle gradually increases and reaches a positive peak as a result of turning the steering wheel. After reaching the positive peak, the steering angle decreases toward the neutral position as a result of turning the steering wheel backward. The steering angle decreases beyond the neutral position to a negative peak and then increases and finally reaches 0 degree. Note that in this example, a positive steering angle means that the steering wheel is turned in the clockwise direction, while a negative steering angle means that the steering wheel is turned in the counterclockwise direction. A lane change can be assumed to be mostly completed when the steering angle turns from a decreasing state to an increasing state. Thus, the viewpoint switcher 35 can determine that the host vehicle has crossed to the next lane when the steering angle turns from a decreasing state to an increasing state. Alternatively, the viewpoint switcher 35 may determine that the host vehicle has crossed to the next lane when the steering angle finally reaches 0 degree. Still alternatively, the viewpoint switcher 35 may use the images from the front camera 10 and the like to determine whether or not the host vehicle has crossed to the next lane.

Figure 5:
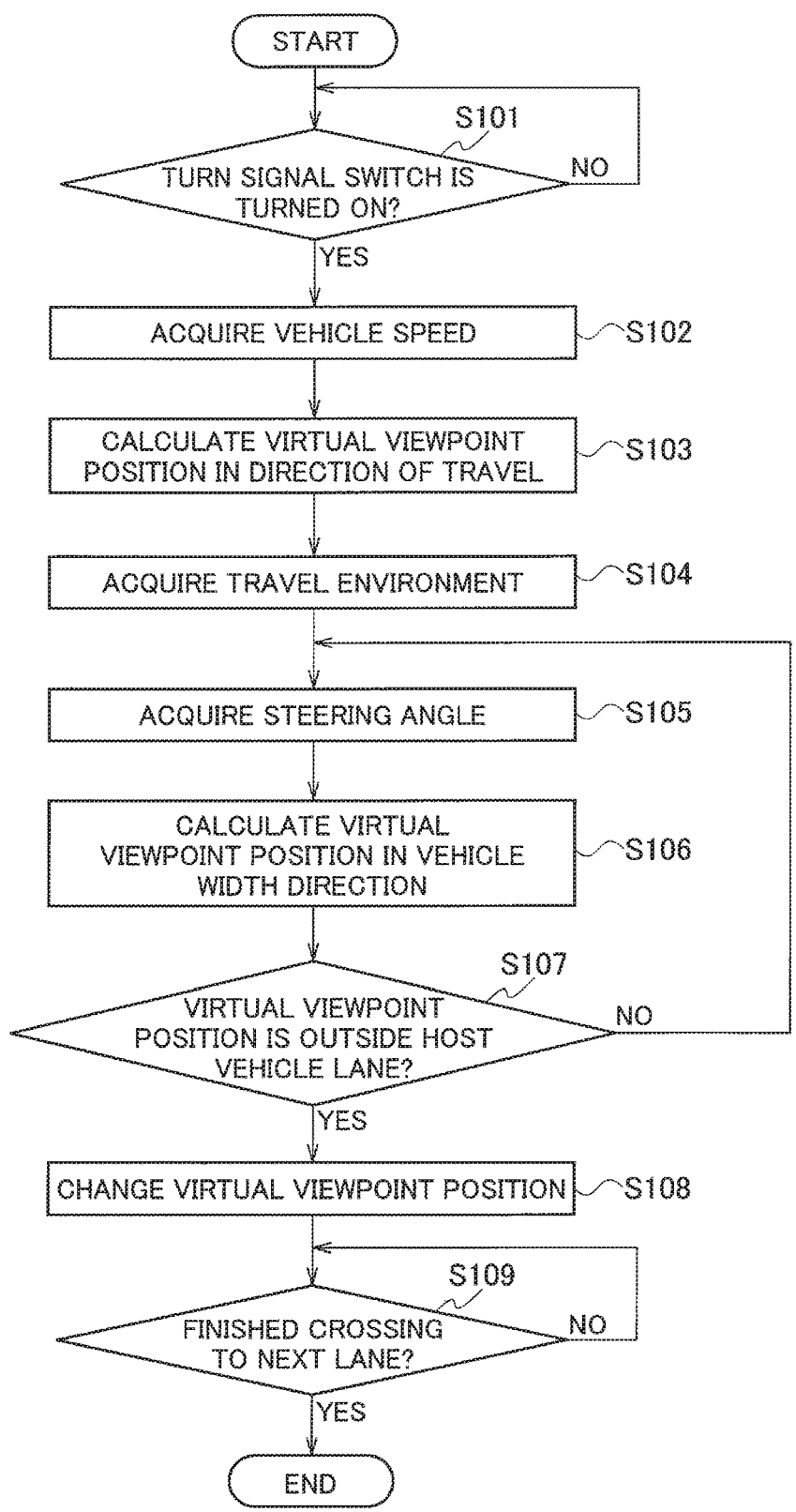
FIG. 5 is a flowchart explaining an example of the operation of the display assistance device according to the first embodiment of the present invention.

Next, an example of the operation of the display assistance device 1 according to the first embodiment will be described with reference to a flowchart illustrated in FIG. 5. This flowchart starts when the ignition switch is turned on.

In step S101, the controller 30 determines whether or not the turn signal switch 17 is turned on. If the turn signal switch is turned on (Yes in step S101), the process proceeds to step S102. On the other hand, if the turn signal switch is not turned on (No in step S101), the controller 30 waits.

In step S102, the controller 30 acquires the vehicle speed from the vehicle speed sensor 16.

In step S103, the virtual viewpoint position calculator 32 calculates the virtual viewpoint position in the direction of travel of the host vehicle based on the acquired vehicle speed.

In step S104, the controller 30 acquires travel environments from the images from the front camera 10 and the like and the navigation device 14. Specifically, the controller 30 determines whether the road the host vehicle is traveling is a straight road or a curve, whether or not a following vehicle or a preceding vehicle is present, and so on. Here, in the first embodiment, description will be given assuming that the road the host vehicle is traveling is determined to be a straight road. A case where the road the host vehicle is traveling is determined to be a curve will be described in the second embodiment.

In step S105, the virtual viewpoint position calculator 32 acquires the steering angle from the steering angle sensor.

In step S106, the virtual viewpoint position calculator 32 calculates the virtual viewpoint position in the vehicle width direction based on the acquired steering angle.

In step S107, the viewpoint switcher 35 determines whether or not the virtual viewpoint position calculated in step S106 is outside the host vehicle lane. If the virtual viewpoint position is outside the host vehicle lane (Yes in step S107), the process proceeds to step S108. On the other hand, if the virtual viewpoint position is not outside the host vehicle lane (No in step S107), the process returns to step S105.

In step S108, the viewpoint switcher 35 changes the virtual viewpoint position to above the lane-change target lane or above the lane line. In other words, the viewpoint switcher 35 switches the virtual viewpoint position from the host vehicle-fixed state to the road-fixed state.

In step S109, the viewpoint switcher 35 determines whether or not the host vehicle has crossed to the next lane. If the host vehicle has crossed to the next lane (Yes in step S109), the viewpoint switcher 35 switches the virtual viewpoint position from the road-fixed state to the host vehicle-fixed state. On the other hand, if the host vehicle has not crossed to the next lane (No in step S109), the process waits.

As described above, the display assistance device 1 according to the first embodiment can achieve the following advantageous effects.

The display assistance device 1 determines whether or not the virtual viewpoint position is outside the host vehicle lane based on the detected steering angle. The display assistance device 1 changes the virtual viewpoint position if determining that the virtual viewpoint position is outside the host vehicle lane. By controlling the virtual viewpoint position based on steering as above, the driver can grasp the situation around the host vehicle.

Also, if determining that the virtual viewpoint position is outside the host vehicle lane, the display assistance device 1 changes the virtual viewpoint position toward a next lane next to the host vehicle lane. Alternatively, if determining that the virtual viewpoint position is outside the host vehicle lane, the display assistance device 1 changes the virtual viewpoint position to above a next lane next to the host vehicle lane or above the lane line between the host vehicle lane and the next lane. In this way, the overhead image of the downward view from the virtual viewpoint can cover a broad area behind the host vehicle. Hence, when a following vehicle is present in the lane-change target lane, the driver can quickly realize the presence of the following vehicle on the display 50. This makes it easier to merge or make a lane change.

Note that when the virtual viewpoint position is in the host vehicle-fixed state, the virtual viewpoint position moves in conjunction with steering. When steering is performed as in a lane change, the view around the host vehicle displayed on the display 50 swings greatly, which may possibly cause visually induced motion sickness. The display assistance device 1 according to the first embodiment changes the virtual viewpoint position from the host vehicle lane to above the lane-change target lane or above the lane line between the host vehicle lane and lane-change target lane if determining that the virtual viewpoint position is outside the host vehicle lane. By switching the virtual viewpoint position from the host vehicle-fixed state to the road-fixed state as above, the display assistance device 1 can suppress the swing of the view around the host vehicle displayed on the display 50 and therefore reduce the visually induced motion sickness.

Meanwhile, in the first embodiment, the process of changing the virtual viewpoint position based on the steering angle may be started upon input of a signal from the turn signal switch 17. When the driver turns on the turn signal switch 17 to the right side, it is a sign of an intention to make a lane change to the right lane. Then, by starting the process of changing the virtual viewpoint position based on the steering angle after input of a signal from the turn signal switch 17, it is possible to prevent a situation where the virtual viewpoint position is changed by an unintended operation on the steering wheel by the driver.

Also, the display assistance device 1 may set the virtual viewpoint position in the road-fixed state and fix the virtual viewpoint position to the host vehicle lane. In this case, after the host vehicle makes a lane change, the display assistance device 1 moves the virtual viewpoint position from above the lane before the lane change to above the lane-change target lane. The timing to move the virtual viewpoint position can be set as follows. As illustrated in FIG. 3A, in the case where the virtual viewpoint position is fixed to the host vehicle lane, the virtual viewpoint position is fixed to the virtual viewpoint position P1' when the host vehicle is traveling in the left lane. At this moment, the steering angle is neutral. As the host vehicle makes a lane change to the right lane, the steering angle changes in the pattern of a sinusoidal wave, as mentioned above, and the steering angle finally returns to neutral, as illustrated by the host vehicle position P7 in FIG. 3A. Then, by detecting the change in steering angle, the viewpoint switcher 35 can switch the virtual viewpoint position when a predetermined time elapses since the steering angle finally returns to neutral. The reason why the predetermined time is provided is that there are individual differences in the timing to finally turn the steering wheel back to neutral in a lane change. Thus, when the predetermined time elapses since the steering angle finally returns to neutral after a lane change is made, the virtual viewpoint position is switched, thereby moving the host vehicle on the display 50. This makes it easier for the driver to check the host vehicle on the display 50.

[Second Embodiment]

Next, the second embodiment of the present invention will be described with reference to FIGS. 6 to 9. A display assistance device 1 according to the second embodiment is the same as the display assistance device 1 in the above-described first embodiment in configuration but is different therefrom in travel scene. While the description has been given of the operation on a straight road as the travel scene in the first embodiment, description will be given of the operation on a curve in the second embodiment.

First, the virtual viewpoint position changed by the viewpoint switcher 35 will be described with reference to FIG. 6.

Figure 6:
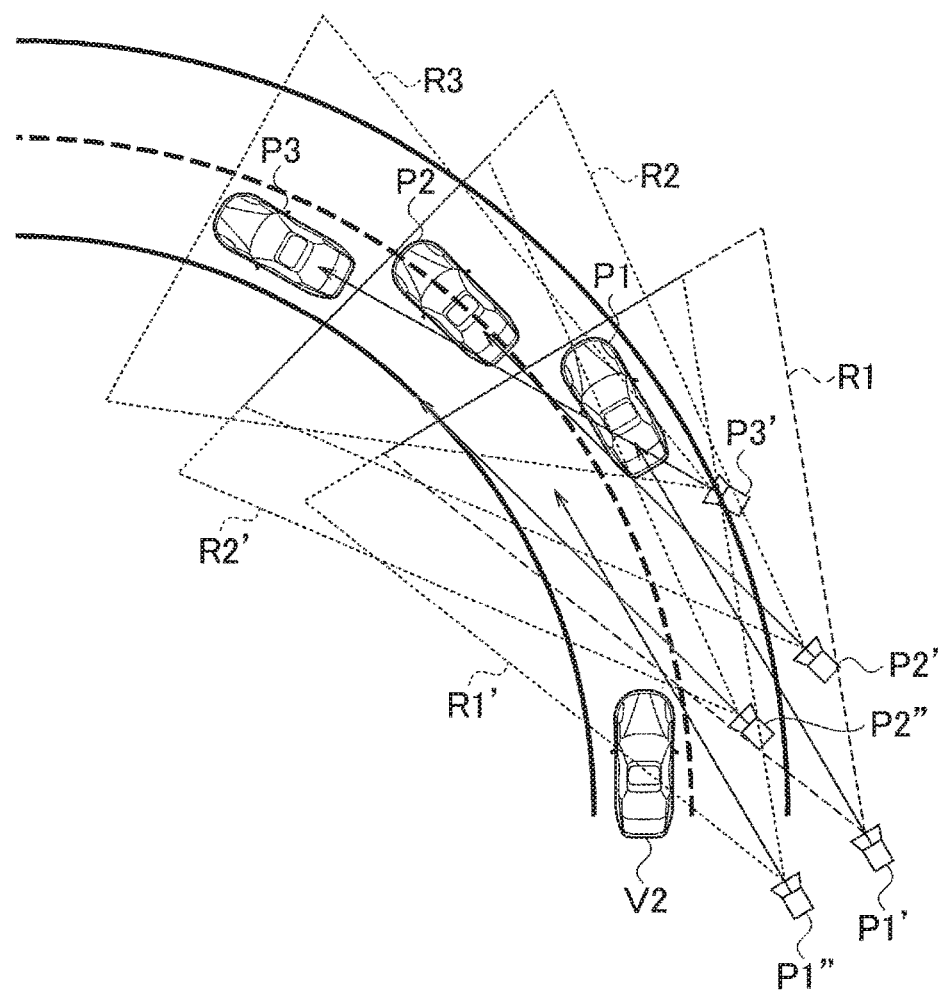
FIG. 6 is a diagram explaining a virtual viewpoint position changed by a display assistance device according to a second embodiment of the present invention.

The travel scene illustrated in FIG. 6 is a scene in which the host vehicle traveling in the right lane (outside lane) of a two-lane road curve makes a lane change to the left lane (inside lane). Reference signs P1 to P3 illustrated in FIG. 6 denote host vehicle positions. Also, reference signs P1' to P3' illustrated in FIG. 6 denote virtual viewpoint positions corresponding to the host vehicle positions P1 to P3, respectively. Also, reference signs R1 to R3 illustrated in FIG. 6 denote the fields of view of overhead images of downward views from the virtual viewpoints. Also, reference sign V2 illustrated in FIG. 6 denotes a following vehicle.

In a case where the host vehicle makes a lane change to the left lane from the host vehicle position P1, the field of view R1 from the virtual viewpoint position P1' may not cover the following vehicle V2, as illustrated in FIG. 6. For this reason, the viewpoint switcher 35 changes the virtual viewpoint position P1' to a virtual viewpoint position P1". Specifically, the viewpoint switcher 35 changes the virtual viewpoint position P1' to the virtual viewpoint position P1" so that the virtual viewpoint position P1" can be situated on an inner side of the curve relative to the virtual viewpoint position P1' and the distance between the virtual viewpoint position P1' and the virtual viewpoint position P1" can be as long as the width of one lane.

Generally, if the curvature of a curve is constant, the steering wheel will be held at a predetermined steering angle during travel on the curve. Hereinafter, the predetermined steering angle for traveling along a curve will be referred to as the fixed steering angle. In a case where no lane change is made during travel on a curve, the amount of change in steering angle from the fixed steering angle is roughly zero. On the other hand, in a case where the host vehicle makes a lane change to the left lane from the host vehicle position P1, as illustrated in FIG. 6, the steering wheel is further turned in the direction of cornering from the fixed steering angle. In other words, the amount of change in steering angle from the fixed steering angle increases in the direction of cornering. The viewpoint switcher 35 acquires the amount of change in steering angle and compares the acquired amount of change and a preset threshold. If determining that the acquired amount of change is larger than the threshold, the viewpoint switcher 35 moves the virtual viewpoint position P1' toward the inner side of the curve by the width of one lane to change it to the virtual viewpoint position P1". In this way, a field of view R1' from the virtual viewpoint position P1" can cover the following vehicle V2.

As the host vehicle travels forward from the host vehicle position P1 to the host vehicle position P2, the amount of change in steering angle is still larger than the threshold. Thus, the virtual viewpoint position remains offset and moves from the virtual viewpoint position P1" to a virtual viewpoint position P2". In this way, a field of view R2' from the virtual viewpoint position P2" is more likely to cover the following vehicle V2 than is the field of view R2 from the virtual viewpoint position P2'.

When the host vehicle travels forward from the host vehicle position P2 to the host vehicle position P3 and the host vehicle therefore crosses to the next lane, the viewpoint switcher 35 cancels the offset. As a result, the virtual viewpoint for the host vehicle position P3 is at the virtual viewpoint position P3'. Note that, to determine whether or not the host vehicle has crossed to the next lane, a method similar to the method described in the first embodiment can be employed.

Meanwhile, although the virtual viewpoint position is moved by the width of one lane in the example illustrated in FIG. 6, the distance of the movement is not limited to this but can be changed as appropriate. The degree of the fixed steering angle and the threshold can be obtained via tests and simulations by using data on road curve profiles and the like.

Figure 7:
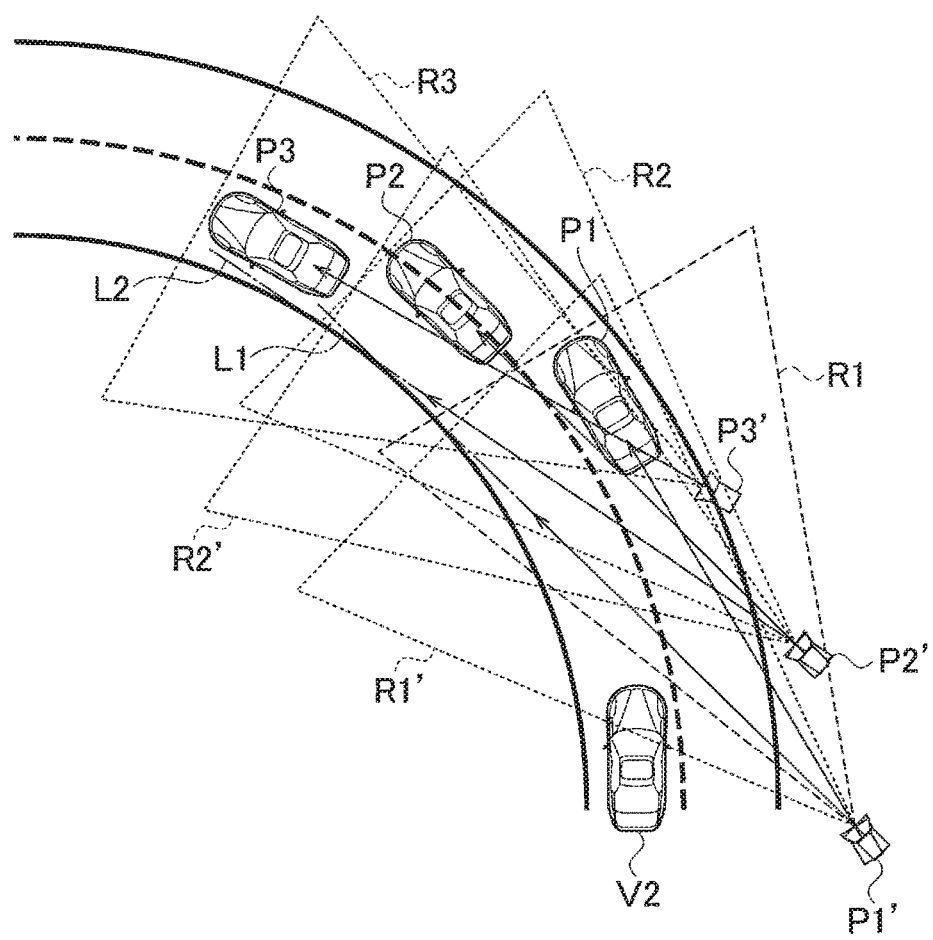
FIG. 7 is a diagram explaining a virtual viewpoint position changed by the display assistance device according to the second embodiment of the present invention.

Also, although the virtual viewpoint position is moved based on the amount of change in steering angle from the fixed steering angle in the example illustrated in FIG. 6, the present invention is not limited to this. For example, as illustrated in FIG. 7, the field of view from the virtual viewpoint at the virtual viewpoint position P1' may be turned toward the inner side of the curve based on the amount of change in steering angle from the fixed steering angle. The degree of the angle of the turn can be set to such a degree that a tangential line L1 extending from the virtual viewpoint position P1' is tangent to the edge line on the inner side of the curve. In this way, the field of view R1' from the virtual viewpoint position P1' can cover the following vehicle V2. Likewise, at the virtual viewpoint position P2' too, the degree of the angle of the turn can be set to such a degree that a tangential line L2 extending from the virtual viewpoint position P2' is tangent to the edge line on the inner side of the curve. In this way, the field of view R2' from the virtual viewpoint position P2' is more likely to cover the following vehicle V2 than is the field of view R2 from the virtual viewpoint position P2'.

Next, another example of the operation in the second embodiment will be described with reference to FIG. 8.

Figure 8:
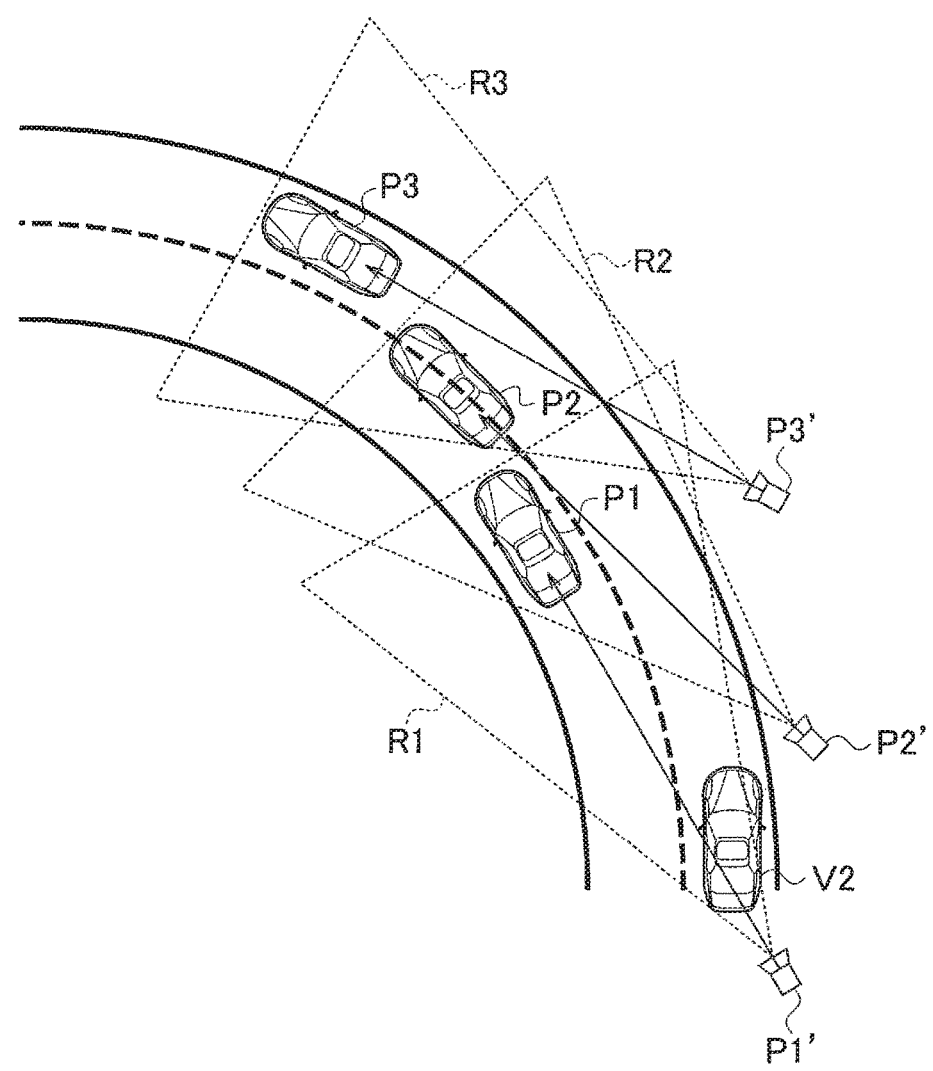
FIG. 8 is another diagram explaining a virtual viewpoint position changed by the display assistance device according to the second embodiment of the present invention.

The travel scene illustrated in FIG. 8 is a scene in which the host vehicle traveling in the left lane (inside lane) of a curved two-lane road makes a lane change to the right lane (outside lane). In this case, the field of view R1 from the virtual viewpoint position P1' covers the following vehicle V2, so that the virtual viewpoint position does not need to be changed. Likewise, the field of view R2 from the virtual viewpoint position P2' and the field of view R3 from the virtual viewpoint position P3' cover the following vehicle V2, so that the virtual viewpoint positions do not need to be changed. Thus, the viewpoint switcher 35 keeps the virtual viewpoint position in the host vehicle-fixed state in the case of making a lane change on a curve from the inside lane to the outside lane. Meanwhile, as for the determining of whether or not a lane change is being made on a curve from the inside lane to the outside lane, the viewpoint switcher 35 can determine that a lane change is being made from the inside lane to the outside lane in a case where the amount of change in steering angle increases in the direction opposite from the direction of cornering.

Figure 9:
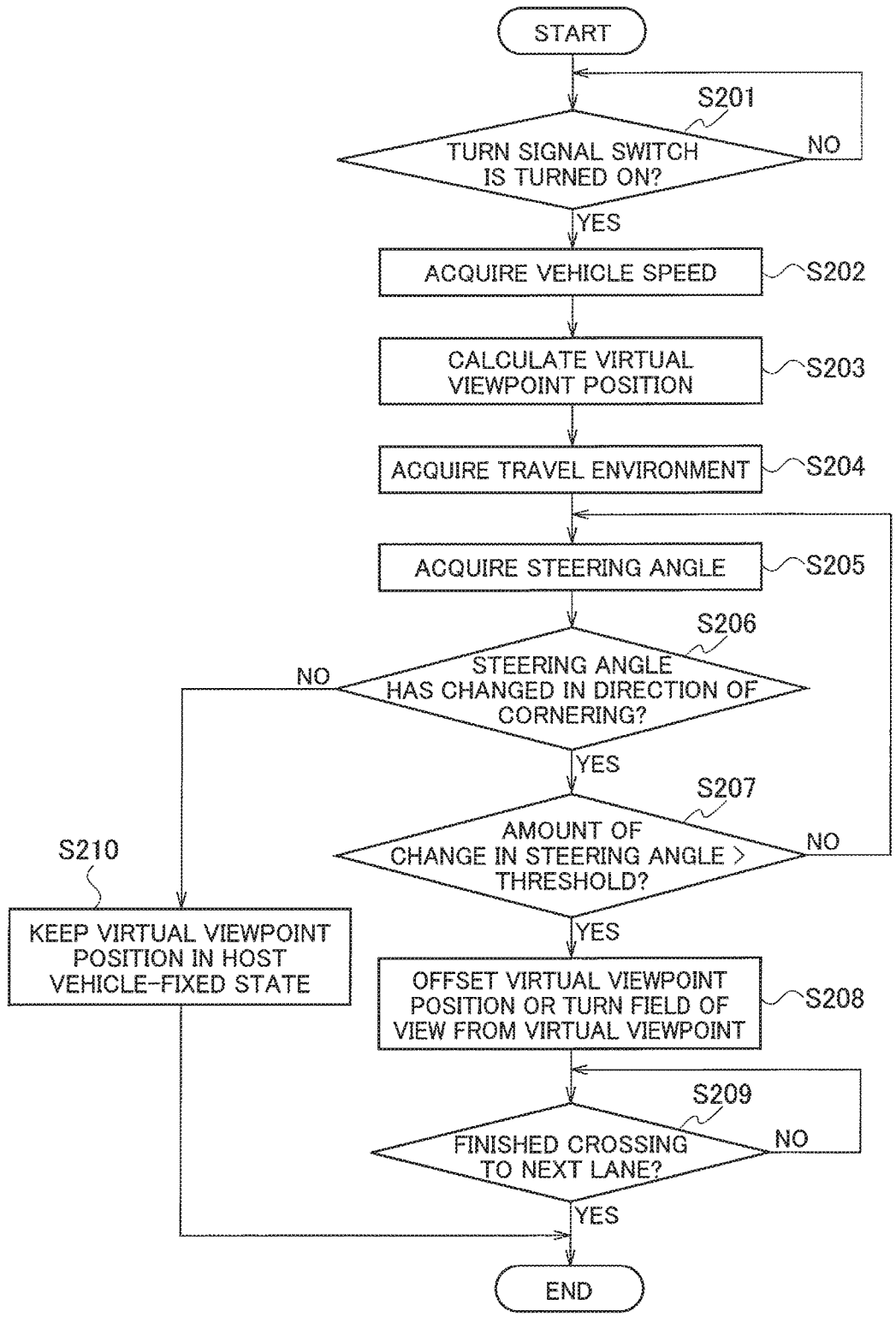
FIG. 9 is a flowchart explaining an example of the operation of the display assistance device according to the second embodiment of the present invention.

Next, an example of the operation of the display assistance device 1 according to the second embodiment will be described with reference to a flowchart illustrated in FIG. 9. However, the operations of steps S201 to S203 and S205 are the same as the operations of steps S101 to S103 and S105 in FIG. 5, respectively, and detailed description thereof will therefore be omitted.

In step S204, the controller 30 acquires travel environments from the images from the front camera 10 and the like and the navigation device 14. Specifically, the controller 30 determines whether the road the host vehicle is traveling is a straight road or a curve, whether or not a following vehicle or a preceding vehicle is present, and so on. Here, in the second embodiment, description will be given assuming that the road the host vehicle is traveling is determined to be a curve.

In step S206, the viewpoint switcher 35 determines whether or not the steering angle has changed from the fixed steering angle in the direction of cornering. If the steering angle has changed in the direction of cornering (Yes in step S206), the process proceeds to step S207. On the other hand, if the steering angle has changed in the direction opposite from the direction of cornering (No in step S206), the process proceeds to step S210.

In step S207, the viewpoint switcher 35 determines whether or not the amount of change in steering angle from the fixed steering angle is larger than a threshold. If the amount of change in steering angle is larger than the threshold (Yes in step S207), the process proceeds to step S208. On the other hand, if the amount of change in steering angle is smaller than or equal to the threshold (No in step S207), the process returns to step S205.

In step S208, the viewpoint switcher 35 moves the virtual viewpoint position toward the inner side of the curve by the width of one lane, or turns the field of view from the virtual viewpoint toward the inner side of the curve.

In step S209, the viewpoint switcher 35 determines whether or not the host vehicle has crossed to the next lane. If the host vehicle has crossed to the next lane (Yes in step S209), the viewpoint switcher 35 cancels the offset of the virtual viewpoint position. On the other hand, if the host vehicle has not crossed to the next lane (No in step S209), the process waits.

In step S210, the viewpoint switcher 35 keeps the virtual viewpoint position in the host vehicle-fixed state.

As described above, the display assistance device 1 according to the second embodiment can achieve the following advantageous effects.

In a case where the host vehicle traveling on a curve makes a lane change from the outside lane of the curve to the inside lane of the curve, the display assistance device 1 moves the virtual viewpoint position toward the inner side of the curve by the width of one lane or turns the field of view from the virtual viewpoint toward the inner side of the curve. In this way, the overhead image of the downward view from the virtual viewpoint can cover a broad area behind the host vehicle. Hence, when a following vehicle is present in the lane-change target lane, the driver can quickly realize the presence of the following vehicle on the display 50. This makes it easier to merge or make a lane change.

Also, by moving the virtual viewpoint position toward the inner side of the curve, the virtual viewpoint position gets closer to the center of the road. Thus, the swing of the view around the host vehicle displayed on the display 50 is small as compared to the case where the virtual viewpoint position is present on the center axis of the host vehicle. In other words, by moving the virtual viewpoint position toward the inner side of the curve, the display assistance device 1 can suppress the swing of the view around the host vehicle displayed on the display 50 and therefore reduce visually induced motion sickness.

Note that in the second embodiment too, as in the first embodiment, the process of changing the virtual viewpoint position based on the steering angle may be started upon input of a signal from the turn signal switch 17. In this way, it is possible to prevent a situation where the virtual viewpoint position is changed by an unintended operation on the steering wheel by the driver.

Also, the virtual viewpoint position may be changed using the radius of curvature of the curve stored in the map database of the navigation device 14. For example, in a case where the radius of curvature of a curve becomes smaller and smaller toward the end of the curve, the curve becomes sharper and sharper. In such a case, the driver further turns the steering wheel in the cornering direction. It can be determined that this turn is to follow the curve and not intended for a lane change. Then, the viewpoint switcher 35 can compare the radius of curvature of the curve and the steering angle and change the virtual viewpoint position depending on the result of the comparison. For example, if the radius of curvature of the curve and the steering angle are equivalent, it is possible to determine that the driver is traveling forward along the road, and the viewpoint switcher 35 therefore keeps the virtual viewpoint position in the host vehicle-fixed state. On the other hand, if the steering angle is smaller than the radius of curvature of the curve, it is possible to determine that the driver is making a lane change from the outside lane of the curve to the inside lane of the curve, and the viewpoint switcher 35 therefore moves the virtual viewpoint position toward the inner side of the curve by the width of one lane or turns the field of view from the virtual viewpoint toward the inner side of the curve. Also, if the steering angle is larger than the radius of curvature of the curve, it is possible to determine that the driver is making a lane change from the inside lane of the curve to the outside lane of the curve, and the viewpoint switcher 35 therefore keeps the virtual viewpoint position in the host vehicle-fixed state. In this way, the display assistance device 1 can display the situation of the periphery on which the driver should focus on the display 50 in accordance with the driver's steering.

[Third Embodiment]

Figure 10:
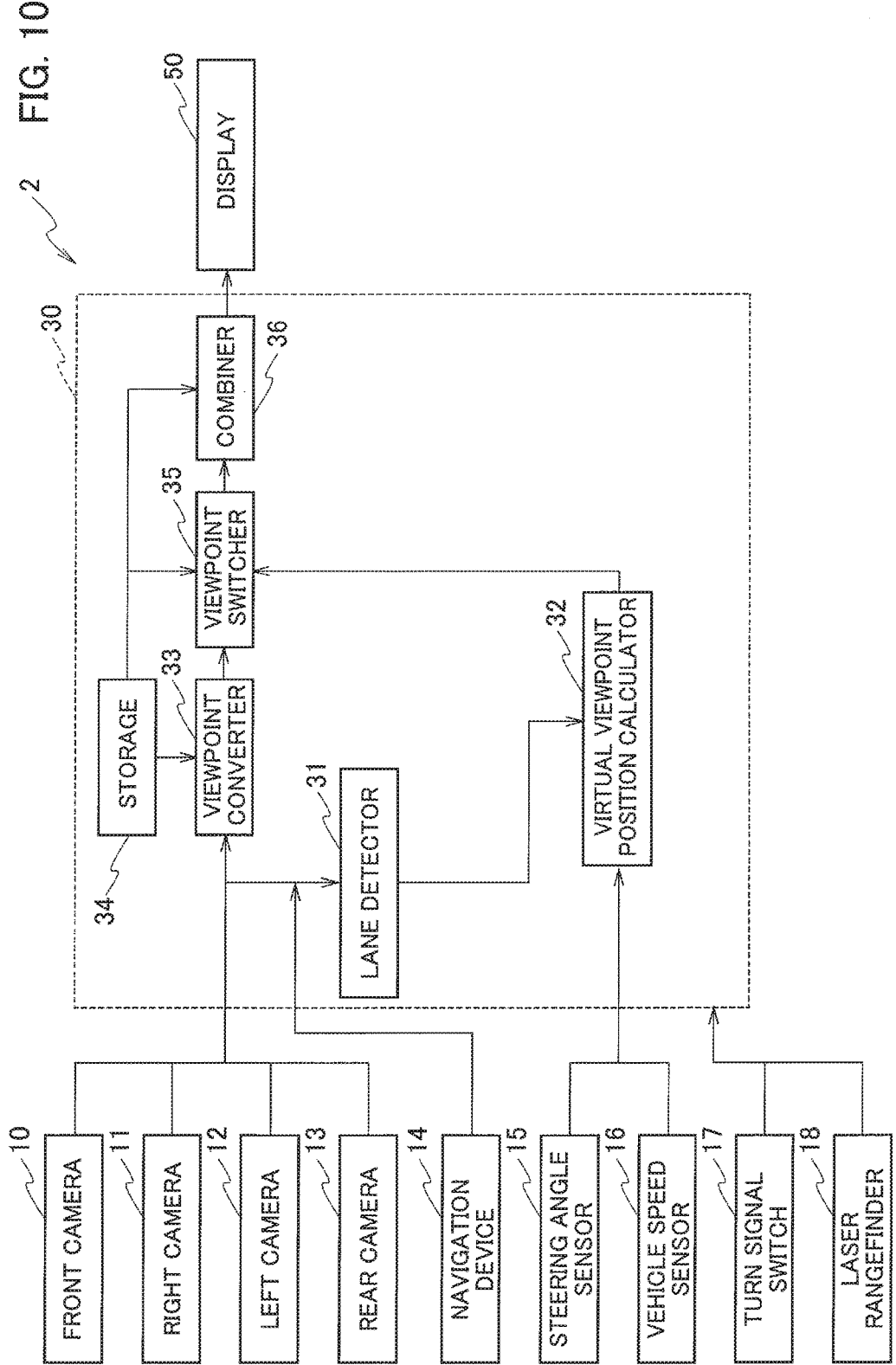
FIG. 10 is a block diagram of a display assistance device according to a third embodiment of the present invention.

Next, a third embodiment of the present invention will be described with reference to FIGS. 10 to 13. The third embodiment differs from the first embodiment in that a display assistance device 2 includes a laser rangefinder 18, as illustrated in FIG. 10. The same components as those in the first embodiment will be referred to by the corresponding reference signs, and description thereof will be omitted. The difference will be mainly described below.

The laser rangefinder 18 (surrounding detecting unit) is a device that detects the environment around the host vehicle, and detects obstacles (such as pedestrians, bicycles, motorcycles, and other vehicles) present around (e.g. within 30 m) the host vehicle. More specifically, the laser rangefinder 18 scans laser light within a predetermined angular range, receives the reflected light, and detects the time difference between the time of emission of the laser light and the time of reception of the reflected light to detect the distances between the host vehicle and the obstacles, the angles, and the like. The laser rangefinder 18 outputs the detected information to the controller 30.

Next, the virtual viewpoint position changed by the viewpoint switcher 35 will be described with reference to FIGS. 11A and 11B.

Figure 11A:
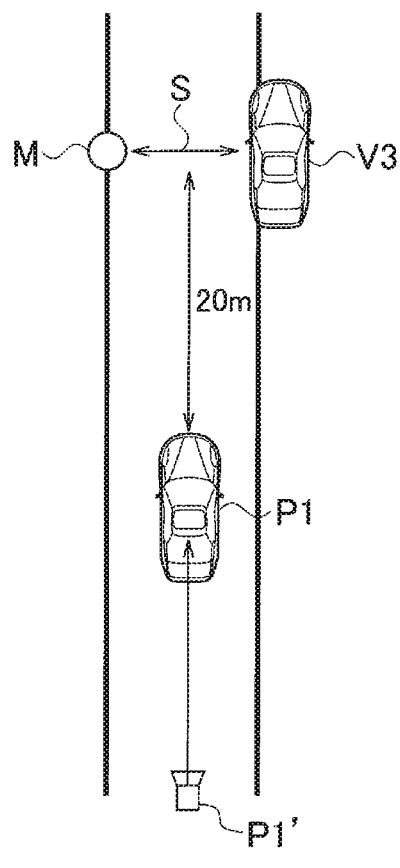
FIGS. 11A and 11B are diagrams explaining a virtual viewpoint position changed by the display assistance device according to the third embodiment of the present invention.

Reference sign S illustrated in FIG. 11A denotes a narrower road. The narrower road S refers to a road with a road width narrower than usual due to the presence of obstacles such as a utility pole M and a parked vehicle V3. The laser rangefinder 18 detects the narrower road S.

As illustrated in FIG. 11A, in a case where the narrower road S is present 20 m ahead of the host vehicle and the host vehicle is at a host vehicle position P1, facing the center of the narrower road S straightforwardly, the center of the overhead image of the downward view from a virtual viewpoint position P1' and the center of the narrower road S coincide with each other. In this way, the narrower road S is displayed at the center of the display 50. Hence, the driver can quickly realize the presence of the narrower road S on the display 50.

Figure 11B:
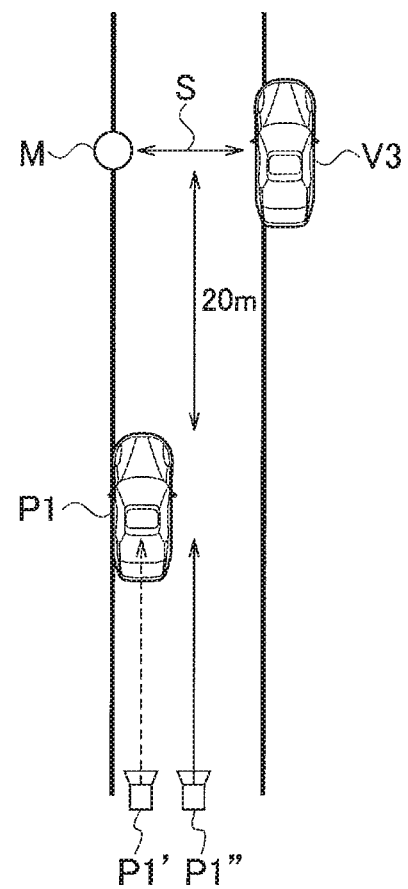

On the other hand, as illustrated in FIG. 11B, in a case where the narrower road S is present 20 m ahead of the host vehicle and the host vehicle is at a host vehicle position P1, not facing the center of the narrower road S straightforwardly, the center of the overhead image of the downward view from a virtual viewpoint position P1' and the center of the narrower road S are offset from each other. In this case, the narrower road S is not displayed at the center of the display 50. Hence, the driver may possibly fail to realize the presence of the narrower road S.

Figure 12:
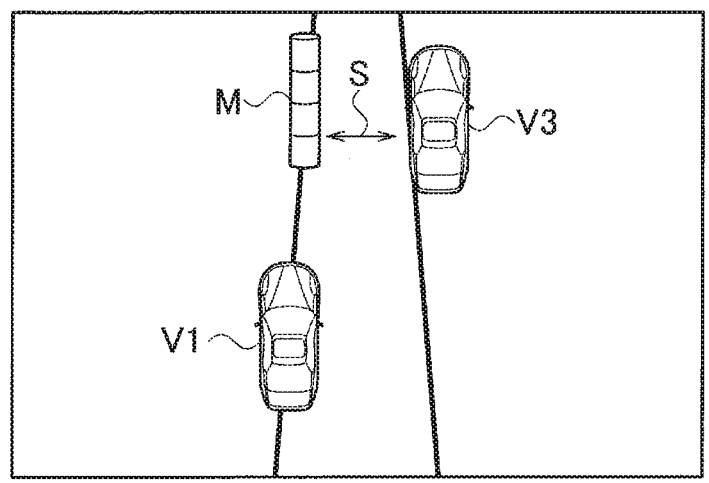
FIG. 12 is a diagram explaining an image displayed on a display by the display assistance device according to the third embodiment of the present invention.

For this reason, in the case where the host vehicle is not facing the center of the narrower road S straightforwardly, the viewpoint switcher 35 changes the virtual viewpoint position from the virtual viewpoint position P1' to a virtual viewpoint position P1", as illustrated in FIG. 11B. Specifically, the viewpoint switcher 35 changes the virtual viewpoint position from the host vehicle-fixed state to the road-fixed state and changes the virtual viewpoint position to a position facing the center of the narrower road S straightforwardly. Consequently, the center of the overhead image of the downward view from the virtual viewpoint position P1" and the center of the narrower road S coincide with each other. Thus, as illustrated in FIG. 12, even when a host vehicle V1 is not facing the center of the narrower road S straightforwardly, the narrower road S is displayed at the center of the display 50. Hence, the driver can quickly realize the presence of the narrower road S on the display 50.

Figure 13:
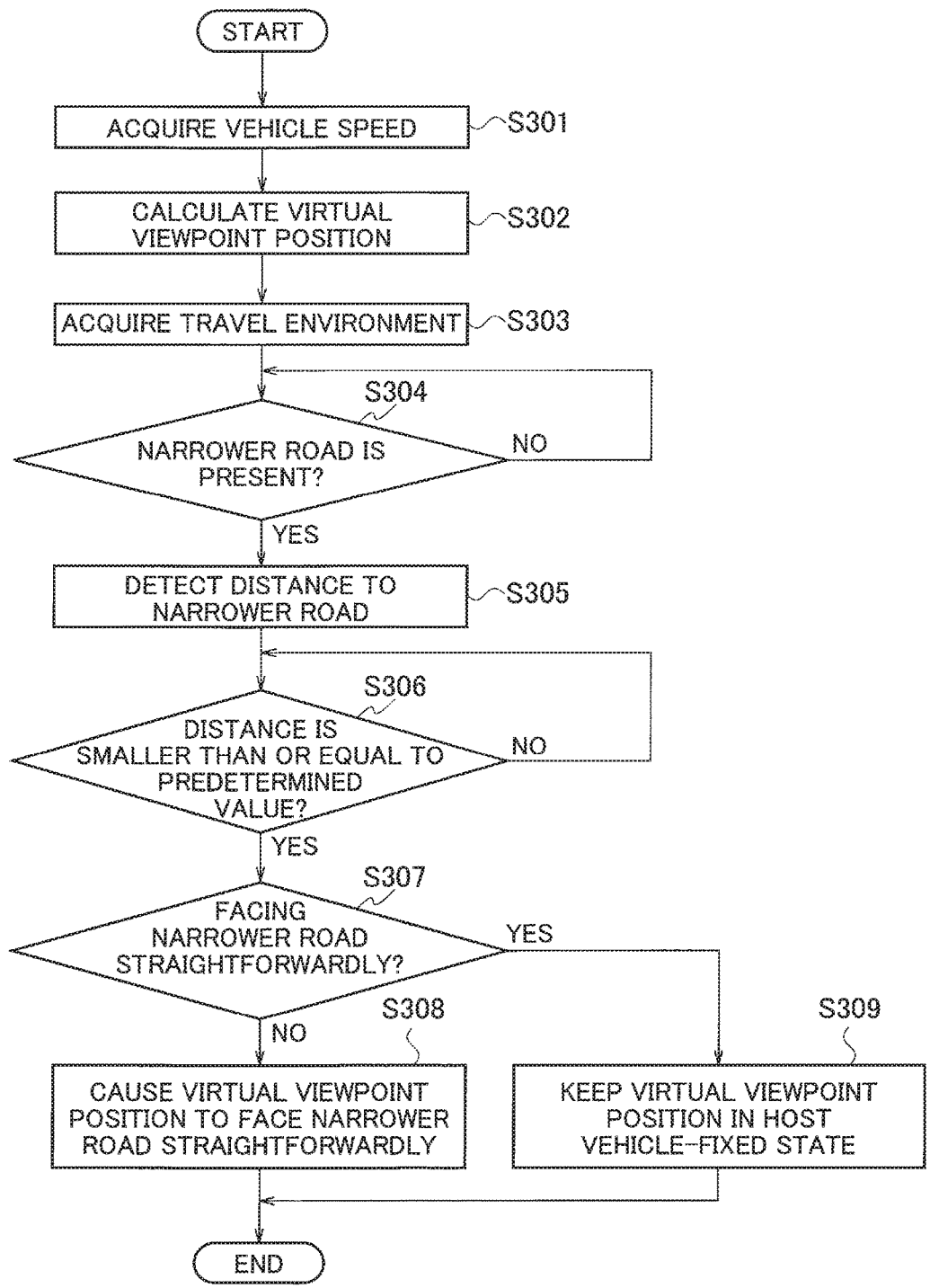
FIG. 13 is a flowchart explaining an example of the operation of the display assistance device according to the third embodiment of the present invention.

Next, an example of the operation of the display assistance device 2 according to the third embodiment will be described with reference to a flowchart illustrated in FIG. 13. However, the operations of steps S301 to S303 are the same as the operations of steps S102 to S104 in FIG. 5, respectively, and detailed description thereof will therefore be omitted.

In step S304, the controller 30 determines whether or not a narrower road S is present ahead of the host vehicle based on the output of the laser rangefinder 18. If a narrower road S is present (Yes in step S304), the process proceeds to step S305. On the other hand, if a narrower road S is not present (No in step S304), the process waits.

In step S305, the controller 30 detects the distance to the narrower road S based on the output of the laser rangefinder 18.

In step S306, the controller 30 determines whether or not the distance to the narrower road S is a predetermined value or smaller. The predetermined value is 20 m, for example. If the distance to the narrower road S is the predetermined value or smaller (Yes in step S306), the process proceeds to step S307. On the other hand, if the distance to the narrower road S is larger than the predetermined value (No in step S306), the process waits. Meanwhile, the reason to determine whether or not the distance to the narrower road S is the predetermined value or smaller is that it will be still early to notify the driver of the presence of the narrower road S if the narrower road S is present at a distance longer than the predetermined value.

In step S307, the controller 30 determines whether or not the virtual viewpoint position is facing the center of the narrower road S straightforwardly. If the virtual viewpoint position is not facing the center of the narrower road S straightforwardly (No in step S307), the process proceeds to step S308. On the other hand, if the virtual viewpoint position is facing the center of the narrower road S straightforwardly (Yes in step S307), the process proceeds to step S309.

In step S308, the viewpoint switcher 35 changes the virtual viewpoint position such that the virtual viewpoint position faces the center of the narrower road S straightforwardly.

In step S309, the viewpoint switcher 35 keeps the virtual viewpoint position in the host vehicle-fixed state.

As described above, the display assistance device 2 according to the third embodiment can achieve the following advantageous effects.

Upon detection of a narrower road S, the display assistance device 2 determines whether or not the virtual viewpoint position is facing the center of the narrower road S straightforwardly. Then, if the virtual viewpoint position is not facing the center of the narrower road S straightforwardly, the display assistance device 2 changes the virtual viewpoint position such that the virtual viewpoint position faces the center of the narrower road S straightforwardly. On the other hand, if the virtual viewpoint position is facing the center of the narrower road S straightforwardly, the display assistance device 2 keeps the virtual viewpoint position in the host vehicle-fixed state. In this way, the narrower road S is displayed at the center of the display 50. Hence, the driver can quickly realize the presence of the narrower road S on the display 50.

Note that although the virtual viewpoint position is changed based on the steering angle in the first embodiment and the second embodiment, the virtual viewpoint position may also be changed using the steering angle in the third embodiment. For example, when a narrower road S is present ahead of the host vehicle, it is possible that the driver will make a lane change to avoid the narrower road S or subtly adjust the steering wheel to pass through the narrower road S. Then, the display assistance device 2 can set a dead range within which changes in steering angle are ignored, and determine whether or not the steering angle is within the dead range. If the steering angle is within the dead range, it is possible to assume that the driver is subtly adjusting the steering wheel to pass through the narrower road S. The display assistance device 2 therefore causes the virtual viewpoint position to face the center of the narrower road S straightforwardly. On the other hand, if the steering angle is outside the dead range, it is possible to assume that the driver is making a lane change to avoid the narrower road S, and the display assistance device 2 therefore changes the virtual viewpoint position from the host vehicle lane to above the lane-change target lane or above the lane line between the host vehicle lane and the lane-change target lane. In this way, the display assistance device 2 can display the situation of the periphery on which the driver should focus on the display 50 in accordance with the driver's steering. Note that the dead range can be obtained via tests and simulations.

Although embodiments of the present invention have been described as above, it should not be understood that the statement and the drawings constituting part of this disclosure limit this invention. Various alternative embodiments, examples, and operation techniques will become apparent to those skilled in the art from this disclosure.

Figure 14A:
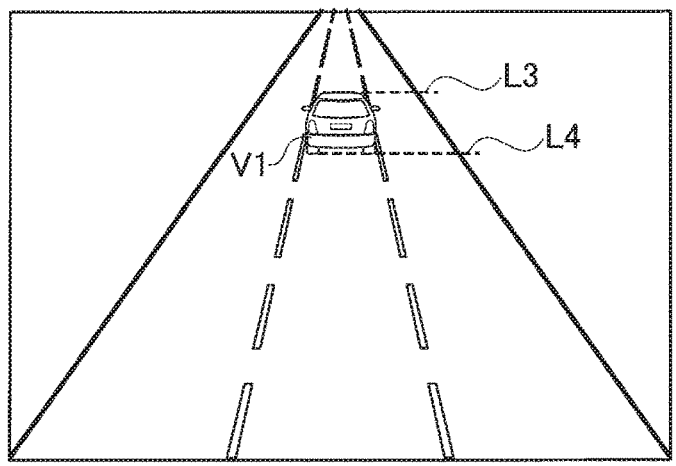
FIGS. 14A-14C are diagrams explaining display examples displayed on a display by display assistance devices according to other embodiments of the present invention.

For example, as illustrated in FIG. 14A, in a case where the host vehicle is attempting to make a lane change from a center lane to a right lane, an upper end line L3 indicating the upper end of the host vehicle V1 (host vehicle icon) displayed on the display 50 and a lower end line L4 indicating the lower end of the host vehicle V1 may be extended from the host vehicle lane and superimposed onto the lane-change target lane, or the right lane. In this way, the driver can easily grasp the position of the host vehicle on the display 50. Moreover, if a following vehicle is present in the right lane, the driver can easily grasp the vehicle-to-vehicle distance to the following vehicle. Note that the combiner 36 may superimpose the upper end line L3 and the lower end line L4 only onto the lane-change target lane, or the right lane.

Figure 14B:
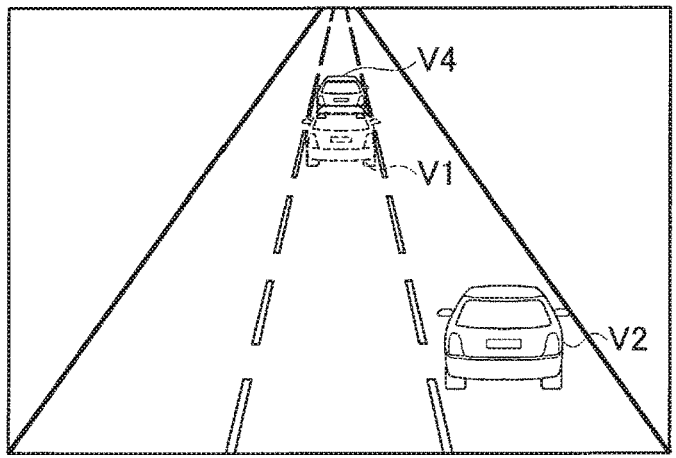

Also, as illustrated in FIG. 14B, the host vehicle V1 may be displayed on the display 50 as a transparent icon capable of being seen through. In this way, the driver can easily distinguish the host vehicle V1 from a preceding vehicle V4 and a following vehicle V2, and easily grasp the situation around the host vehicle V1.

Figure 14C:
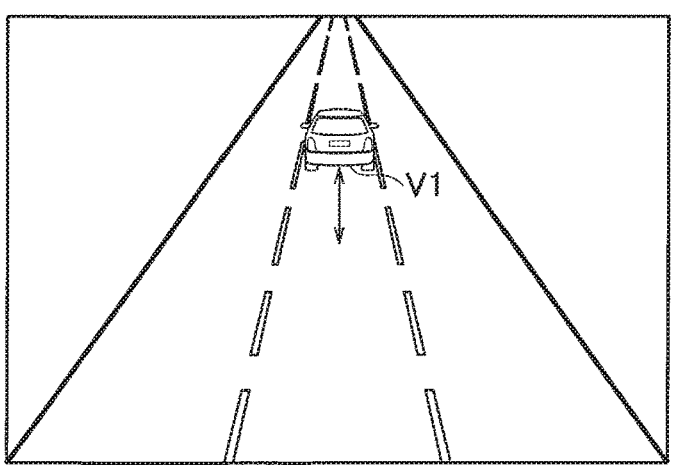

Also, as illustrated in FIG. 14C, editing may be performed to display the host vehicle V1 above the center of the display 50. In this way, the driver can easily check the presence of a following vehicle.

Although the virtual viewpoint position is changed based on the steering angle in the present invention, the present invention is not limited to this. For example, the virtual viewpoint position may be changed based on a yaw rate detected using a yaw rate sensor.

Also, the present invention is applicable to autonomous vehicles.

REFERENCE SIGNS LIST 10 front camera
11 right camera
12 left camera
13 rear camera
14 navigation device
15 steering angle sensor
16 vehicle speed sensor
17 turn signal switch
18 laser rangefinder
30 controller
31 lane detector
32 virtual viewpoint position calculator
33 viewpoint converter
34 storage
35 viewpoint switcher
36 combiner
50 display

The invention claimed is:

1. A display assistance device that converts images captured by a plurality of cameras installed on a vehicle into an overhead image of a downward view from a virtual viewpoint in air, and displays the overhead image on a display with a host vehicle icon superimposed on the overhead image, the host vehicle icon indicating a position of the vehicle, the display assistance device comprising:
a computer that determines whether or not the vehicle is making a lane change from a travel lane in which the vehicle is traveling to a next lane next to the travel lane, and changes a position of the virtual viewpoint if determining that the vehicle is making the lane change, wherein the computer changes the position of the virtual viewpoint when the position of the virtual viewpoint moves out of a host vehicle lane, the computer does not change the position of the virtual viewpoint when the position of the virtual viewpoint does not move out of the host vehicle lane, and in a case where the vehicle is making a lane change from a travel lane in which the vehicle is traveling to a next lane next to the travel lane, the computer changes the position of the virtual viewpoint toward the next lane.

2. The display assistance device according to claim 1, wherein in a case where the vehicle is making a lane change from a travel lane in which the vehicle is traveling to a next lane next to the travel lane, the computer changes the position of the virtual viewpoint to above the next lane or above a boundary line between the travel lane and the next lane.

3. The display assistance device according to claim 1, wherein when a predetermined time elapses after the vehicle makes a lane change, the computer changes the position of the virtual viewpoint to a lane to which the lane change was made.

4. The display assistance device according to claim 1, wherein the computer sets the position of the virtual viewpoint as a position relative to the host vehicle in accordance with a speed of the host vehicle.

5. The display assistance device according to claim 1, wherein in a case where the vehicle is traveling on a curve and making a lane change from an outside lane of the curve to an inside lane of the curve, the computer moves the position of the virtual viewpoint toward an inner side of the curve or turns a field of view from the virtual viewpoint toward the inner side of the curve, and in a case where the vehicle is traveling on the curve and making a lane change from the inside lane of the curve to the outside lane of the curve, the computer moves the position of the virtual viewpoint toward the inner side of the curve or turns the field of view from the virtual viewpoint toward an outer side of the curve.

6. The display assistance device according to claim 1, further comprising:

a laser that detects an environment around the vehicle, wherein in a case where the laser detects a narrower road ahead of the vehicle, the computer changes the position of the virtual viewpoint such that the virtual viewpoint faces a center of the narrower road straightforwardly.

7. A display assistance method involving converting images captured by a plurality of cameras installed on a vehicle into an overhead image of a downward view from a virtual viewpoint in air, and displaying the overhead image on a display with a host vehicle icon superimposed on the overhead image, the host vehicle icon indicating a position of the vehicle, the display assistance method comprising:

a first step of determining whether or not the vehicle is making a lane change from a travel lane in which the vehicle is traveling to a next lane next to the travel lane; and a second step of changing a position of the virtual viewpoint if determining that the vehicle is making the lane change, wherein in the second step, the position of the virtual viewpoint is changed in a case where the position of the virtual viewpoint moves out of a host vehicle lane, wherein in the second step, the position of the virtual viewpoint is not changed in a case where the position of the virtual viewpoint does not move out of the host vehicle lane, and wherein in a case where the vehicle is making a lane change from a travel lane in which the vehicle is traveling to a next lane next to the travel lane, the changes the position of the virtual viewpoint toward the next lane.

8. A display assistance device that converts images captured by a plurality of cameras installed on a vehicle into an overhead image of a downward view from a virtual viewpoint in air, and displays the overhead image on a display with a host vehicle icon superimposed on the overhead image, the host vehicle icon indicating a position of the vehicle, the display assistance device comprising:

a computer that determines whether or not the vehicle is making a lane change from a travel lane in which the vehicle is traveling to a next lane next to the travel lane, and changes a position of the virtual viewpoint if determining that the vehicle is making the lane change, wherein the computer changes the position of the virtual viewpoint when the position of the virtual viewpoint moves out of a host vehicle lane, the computer does not change the position of the virtual viewpoint when the position of the virtual viewpoint does not move out of the host vehicle lane, and the computer sets the position of the virtual viewpoint as a position relative to the host vehicle in accordance with a speed of the host vehicle.

9. The display assistance device according to claim 8, wherein in a case where the vehicle is making a lane change from a travel lane in which the vehicle is traveling to a next lane next to the travel lane, the computer changes the position of the virtual viewpoint toward the next lane.

10. The display assistance device according to claim 9, wherein the computer superimposes an upper end line indicating an upper end of the host vehicle icon and a lower end line indicating a lower end of the host vehicle icon onto the next lane.

11. The display assistance device according to claim 10, wherein the computer superimposes the host vehicle icon as a transparent icon capable of being seen through.

12. The display assistance device according to claim 10, wherein the computer superimposes the host vehicle icon onto the overhead image above a center thereof.

* * * * *